S. R. Parkhurst,
Cotton Gins,
No 51,962. Patented Jan. 9, 1866.
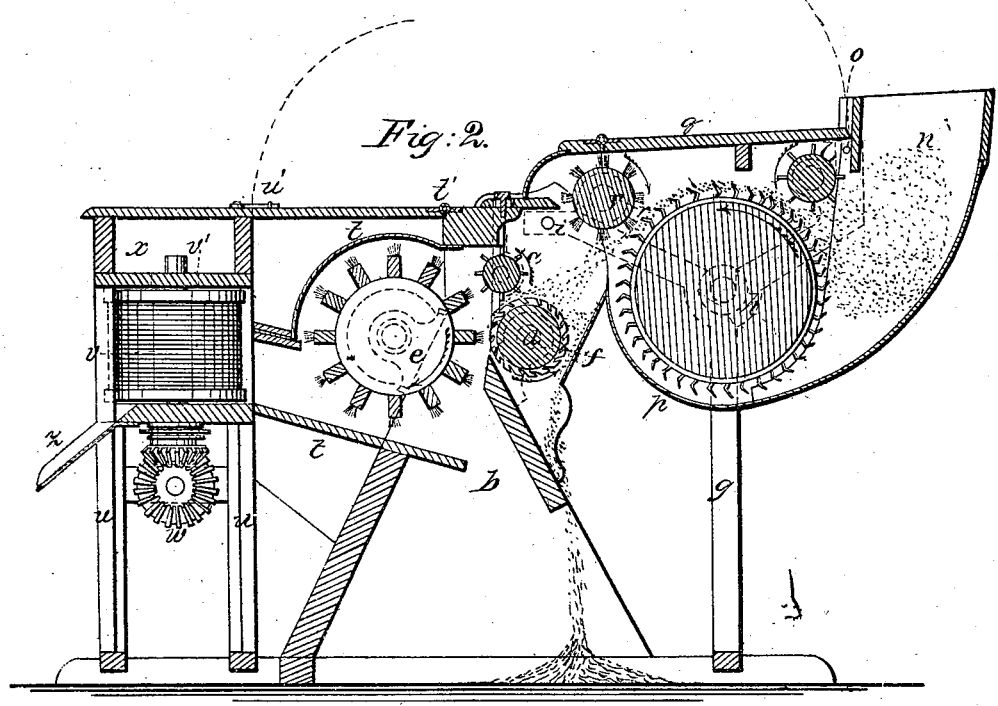
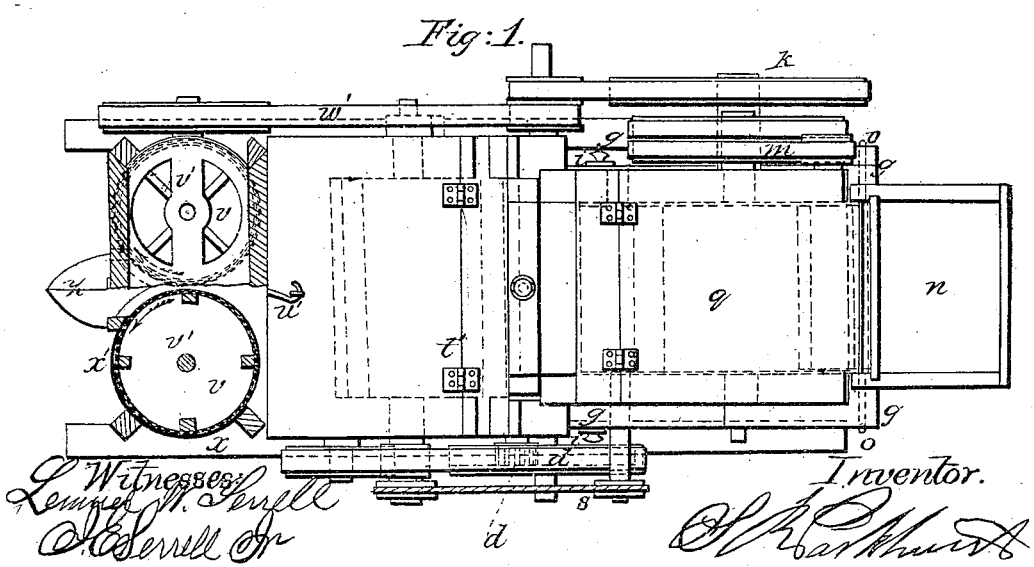

UNITED STATES PATENT OFFICE.

S. R. PARKHURST, OF BLOOMFIELD, NEW JERSEY, ASSIGNOR TO EMILY R. PARKHURST, OF SAME PLACE.

IMPROVEMENT IN COTTON-GINS.

Specification forming part of Letters Patent No. 51,962, dated January 9, 1866.

*To all whom it may concern:*

Be it known that I, STEPHEN R. PARKHURST, of Bloomfield, in the county of Essex and State of New Jersey, have invented, made, and applied to use a certain new and useful improvement in Cotton-Gins; and I do hereby declare the following to be a full, clear, and exact description of the same, reference being had to the annexed drawings, making part of this specification, wherein—

Figure 1 is a plan of my gin with a portion of the case removed; and Fig. 2 is a vertical longitudinal section of the said gin.

Similar marks of reference denote the same parts.

In cotton-gins heretofore manufactured it has been usual to place the cotton in a hopper contiguous to a revolving cylinder of teeth, which cylinder causes the cotton to revolve in the hopper in the form of a roll. To this roll the seeds adhere, and fall away when there is no lint upon them to cause them to adhere to the roll; but this mass of seeds upon the outer portion of the roll interferes with the teeth, taking the cotton fiber, and the gin also has to be fed with care, or the roll will become smaller in one part than another and break up and cease to revolve properly.

The object of my invention is to feed the gin from a hopper, into which hopper the cotton may be turned in a mass, so that the feeding is automatic and the bat of cotton fed to the ginning-cylinder is deprived of its seeds, and passes directly through the machine, while the seeds fall from the ginning-cylinder and out of the way.

In the drawings, $a$ is the ginning-cylinder, formed in any desired manner. I have shown it as made with teeth undercut in steel rings. This cylinder is revolved by competent power, and is sustained in the main frame $b$ of the machine.

The seeds are kept back and separated from the cotton by any known or suitable device. I have shown a revolving stripper, $c$, driven by an internal gear, $d$, on the shaft of the ginning-cylinder $a$, acting upon a pinion on the shaft of the stripper $c$, as in Letters Patent granted to me April 27, 1858.

$e$ is a brush-blower that takes the cotton away from the cylinder $a$ and delivers it, and $f$ is an inclined board or plate down which the seeds roll as they are separated from the cotton, which plate is sufficiently close to cause the teeth of the cylinder to come in contact with any fibers adhering to the seeds and carry them up to be acted upon again, while the cleaned seeds fall away.

For convenience of access to the ginning-cylinder $a$, I mount my feeding apparatus upon a movable frame, $g$, that is attached, by screws or otherwise, at $i$ to the main frame $b$, and in this frame $g$, I mount a cylinder, $h$, rotated slowly by competent power. I have shown belts at $k$, and above this cylinder $h$ is a stripper, $l$, rotated rapidly by the belt $m$, or otherwise. To the front of the cylinder $h$ is a hopper, $n$, hinged to $g$ at the point $o$, for convenience of moving the hopper back, as seen by the dotted arc, in case the cotton becomes clogged in the hopper and does not feed down properly, and from near the lower edge of the hopper a curved plate, $p$, extends around to the plate $f$, so that no cotton can drop down among the seeds; and $q$ is a lid above the cylinder $h$, giving access, when necessary, to the cylinder $h$, stripper $l$, and a brush or blower, $r$, driven rapidly by the belt $s$ or otherwise. The respective cylinders, beaters, and brushes rotate in the directions indicated by the arrows upon them, and the cylinder $h$ is armed with teeth, which I prefer to be open, strong card-teeth, and as the said cylinder $h$ rotates its teeth fill themselves with cotton from the hopper $n$, and the stripper $l$ keeps back surplus cotton, so that only the amount held by the teeth of $h$, together with the seeds, go past said stripper and are thrown by the brush $r$ off the teeth of $h$ upon the ginning-cylinder $a$. The speed of rotation of the cylinder $h$ is so adjusted or determined that only as much cotton is supplied thereby as the cylinder $a$ can gin clean and without accumulation of cotton between the ginning-cylinder $a$ and stripper $c$, so that the seeds are free to fall away, and the ginning goes on with uniformity and certainty in consequence of my device becoming an automatic feed to the gin. The momentum of the cotton, as it is thrown from the brush $r$ upon the cylinder $a$, causes the cotton to bed itself into the teeth, and the seeds resting on the surface of said teeth are easily separated from the cotton.

The case $t$ of the blower $e$ is hinged to the frame $b$ at $t'$, so that it may be lifted, and for convenience the frame $w$ of the condensing-cylinders $v$ is made movable, and connected to the machine by a hook at $u'$, or otherwise.

The cylinders $v$ are made of wire-gauze or perforated sheet metal or other material, and stand upon vertical shafts $v'$, driven by miter-gearing $w$ and a belt, $w'$, or other convenient mechanism. The upper heads of the cylinders $v$ are made open or with arms, and the bottom of the trunk $x$ is made with similar openings, so that air containing dust, &c., may be blown from the blower $e$, through the gauze of the cylinder $v$, away by the trunk $x$ out of doors or to any convenient point; and, to prevent air passing through both sides of the cylinders $v$ as much as possible, I surround the same with cases, as shown at $x'$, which pass nearly half-way around the cylinders from the blower-trunk to the point for the delivery of the cotton.

As the cylinders $v$ revolve in the direction indicated by the arrows, Fig. 1, the lint deposited upon their foraminous surface will be conveyed out between them, and will fall vertically away in the form of a sliver or roving over the conductor $z$, and the small amount of air passing through the cylinders $v$ and out at the vertical opening through which the cotton is delivered will insure the lint passing off the surface of the perforated cylinders $v$.

The condensing-cylinders, being upon vertical shafts, cause an equalization of the fiber by delivering it in the form of a sliver or roving, whereas in those condensers that deliver the fiber in a sheet or bat the edges thereof are almost always thinner than the central portion, because the ginning-cylinder is almost always fed more and more fully operative in the middle than at the ends; hence said bat could not be fed to carding-machines, whereas the sliver in which my fiber is delivered is adapted to immediate use in any subsequent operations, as it is equalized by the fibers being brought continuously from the sides to the middle.

What I claim, and desire to secure by Letters Patent, is—

1. In combination with mechanism for ginning cotton, automatic mechanism for removing from a mass of cotton a supply of cotton and seeds to be transferred in a regular manner to the ginning mechanism, for the purposes and substantially as set forth.

2. In combination with a ginning mechanism, a feeding cylinder or surface armed with teeth to take the cotton gradually from a hopper and convey it to a position for delivery to the ginning-cylinder, substantially as specified.

3. The combination of the following four devices: first, a ginning-cylinder; second, a feeding cylinder or surface armed with teeth to take the cotton from the mass in the hopper; third, the stripper or equivalent mechanism to keep the surplus cotton in the hopper; and, fourth, a brush or cylinder to transfer the cotton from the feeding-surface to the ginning-cylinder, substantially as set forth.

4. The combination of a feeding cylinder or surface armed with teeth, a ginning-cylinder, and a revolving stripper to remove the seeds from the cotton, substantially as specified.

5. A pair of condensing-cylinders formed of gauze or finely-perforated surfaces, and sustained by vertical shafts, substantially as specified, so that the fiber shall be delivered from a vertical opening and pass away in the form of a loose sliver or roving, as set forth.

6. The perforated cylinders $v$ $v$ on vertical shafts, in combination with the trunk $x$, through which the blast of air is conveyed away, as set forth.

In witness whereof I have herewith set my signature this 28th day of August, 1865.

S. R. PARKHURST.

Witnesses:
LEMUEL W. SERRELL,
J. E. SERRELL, Jr.